United States Patent [19]
Oliver et al.

[11] Patent Number: 6,086,620
[45] Date of Patent: Jul. 11, 2000

[54] AUDIO SAMPLE TRACKER

[75] Inventors: Richard J. Oliver, Laguna Beach; Casper William Barnes, Murrieta, both of Calif.

[73] Assignee: Sony Pictures Entertainment, Inc., Culver City, Calif.

[21] Appl. No.: 08/960,019

[22] Filed: Oct. 29, 1997

Related U.S. Application Data

[63] Continuation of application No. 08/936,366, Sep. 24, 1997, abandoned.

[51] Int. Cl.[7] .................................................. G06G 7/62
[52] U.S. Cl. .............................. 703/13; 710/61; 369/47; 360/69
[58] Field of Search .................. 395/500.34; 710/61; 369/47, 48, 49, 50; 360/55, 62, 69, 70

[56] References Cited

U.S. PATENT DOCUMENTS

| | | | |
|---|---|---|---|
| 4,772,966 | 9/1988 | Sharples et al. | 360/71 |
| 5,469,517 | 11/1995 | Ohta | 382/252 |
| 5,602,813 | 2/1997 | Furumiya | 369/50 |
| 5,619,733 | 4/1997 | Noe et al. | 395/881 |
| 5,661,665 | 8/1997 | Glass et al. | 348/423 |
| 5,706,473 | 1/1998 | Yu et al. | 395/500.34 |
| 5,914,924 | 6/1999 | Takagi et al. | 369/47 |
| 5,920,530 | 7/1999 | Kuroda et al. | 369/47 |
| 5,995,465 | 11/1999 | Hayashi et al. | 369/47 |

FOREIGN PATENT DOCUMENTS

| | | | |
|---|---|---|---|
| 758124 A2 | 2/1997 | Germany | G11B 19/28 |
| PCT/US93/ 00453 | 7/1993 | WIPO | G11B 5/86 |

OTHER PUBLICATIONS

Perez–Luque et al.;"A Temporal Reference Framework for Multimedia Synchronization", IEEE Journal on Selected Areas in Communications, vol. 14, No. 1, pp. 35–51, Jan. 1996.

Huang et al.;"Multimedia Synchronization for Live Presentation Using the N–buffer Approach", Proceedings of the 1995 International Conference on Network Protocols, pp. 244–251, Nov. 1995.

Rothlisberger, U.;"Adaptive Synchronization for Continuous Media Storage in a Multimedia Communication System", IEEE COMSOC International Workshop on Multimdeia Communications, pp. 7/3/1–7/3/3, May 1994.

Rangan et al., "Feeback Techniques for Continuity and Synch. in Multimedia Informations Retrieval", ACM Transactions on Information Systems, vol. 13, Issue 2, pp. 145–176, Apr. 1995.

Embedded Systems Programming by Garth Gaddy, May 1997, pp. 62 to 72.

*Primary Examiner*—Kevin J. Teska
*Assistant Examiner*—Douglas W. Sergent
*Attorney, Agent, or Firm*—Fulwider Patton Lee & Utecht, LLP

[57] ABSTRACT

A system for processing audio samples, which compensates for any error between a future state of the system after a delay through a network and the predicted value of the input at that future time. The system synchronizes the motion of an audio transport to the motion of an audio input which has been delayed in processing through the network.

10 Claims, 4 Drawing Sheets

AUDIO SAMPLE TRACKER

RELATED APPLICATION

This application is a continuation of application Ser. No. 08/936,366, filed on Sep. 24, 1997 now abandon.

BACKGROUND OF THE INVENTION

1. Field of the Invention

The present invention relates generally to motion control systems. It relates more particularly to a system for controlling the motion of an audio transport responsive to the motion of an audio input, for synchronizing media recording and playback.

2. Art Background

Signal processors have been used recently to control motion in various devices. In general there is an input that tells the system what state it should be in, such as a position, pressure, current through a motor winding, or the like. The input goes into a motion controller. There is a generalized system that is being controlled, which has an actual state, such as its present position, pressure, current, or the like. The system may include a network and a feedback loop. There can be delays introduced in the states in processing through the system. The states may be compared in a comparing element, and if they are the same, then the output from the comparing element is zero. If the states are different, there is an error between where the system is and where it should be, which needs to be addressed. Traditional motion controllers attempt to minimize the error between the present input and the present state of the system.

However, in a device such as an audio player and recorder for media playback and recording, which includes a system of networked components for processing the motion imparted by a user to an audio input to generate an audio sample rate output for controlling the motion of an audio transport, to synchronize the motion of the audio transport to the audio input, traditional motion controllers may be unstable because the system architecture introduces a significant delay between the motion controller and the transports being controlled. Also, system implementation is complicated because of the need to keep track of the delayed inputs which have not taken effect in the system, to accumulate that information, and to determine what inputs to send next to correct for the delays in addition to sending the new input.

Therefore, there has been a need existing for a system which is capable of synchronizing the motion of an audio transport for media recording to the motion of an audio input for media playback, which compensates for delays in the system between the input and the transport. The present invention fulfills those needs.

SUMMARY OF THE INVENTION

Briefly, and in general terms, the present invention provides a system for minimizing the error between a future state of the system after a delay and the predicted value of the input at that future time, by predicting the future input and calculating the expected future system state.

The system processes audio samples. It includes means for generating an audio sample rate input from the motion of an audio source which generates the audio samples, and means for generating an audio sample rate output from the audio sample rate input, to control the motion of an audio transport. The output generating means include a network for processing the audio sample rate input to generate the audio sample rate output, which network introduces a delay in the audio sample rate input, generating a delayed audio sample rate input. The system further includes means for tracking the audio sample rate and compensating for the delay in the audio sample rate input to synchronize the audio sample rate output with the audio sample rate input. The tracking means include means for generating a predicated audio sample rate as of the time of the delayed input, means for generating a calculated audio sample rate as of the time of the delayed input, and means for minimizing any error between the predicted audio sample rate and the calculated audio sample rate.

One aspect of the present invention is that the system compensates for any error between a future state of the system after a delay through a network and the predicted value of the input at that future time.

Another aspect of the present invention is that the system synchronizes the motion of an audio transport to the motion of an audio input which has been delayed in processing through the network.

Other features and advantages of the invention will become apparent from the following detailed description taken in conjunction with the accompanying drawings, which illustrate, by way of example, the features of the invention.

DETAILED DESCRIPTION OF THE PREFERRED EMBODIMENTS

Figure 1:
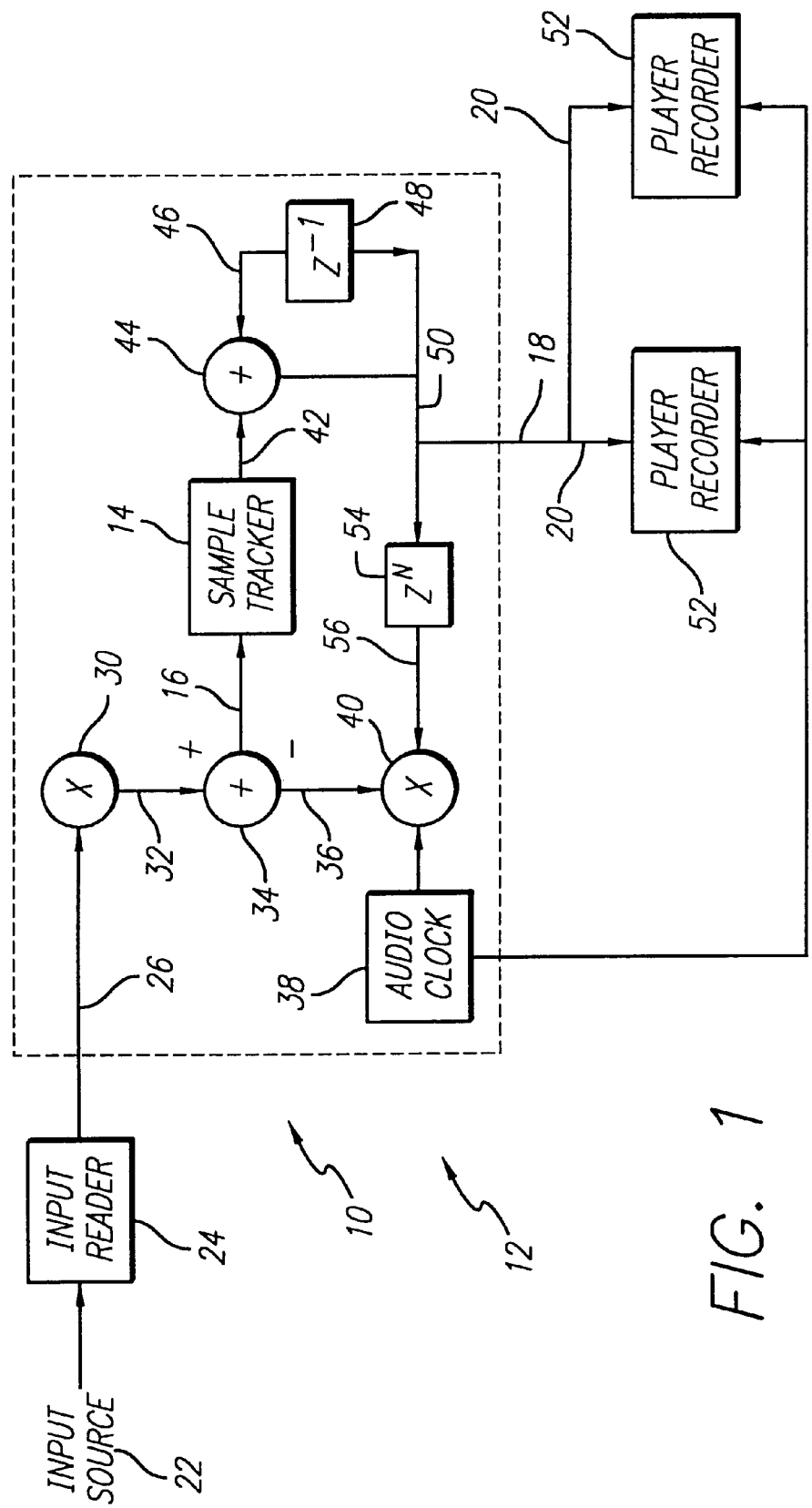
FIG. 1 illustrates the high level structure of an audio sample processing system in accordance with the present invention.
Figure 2:
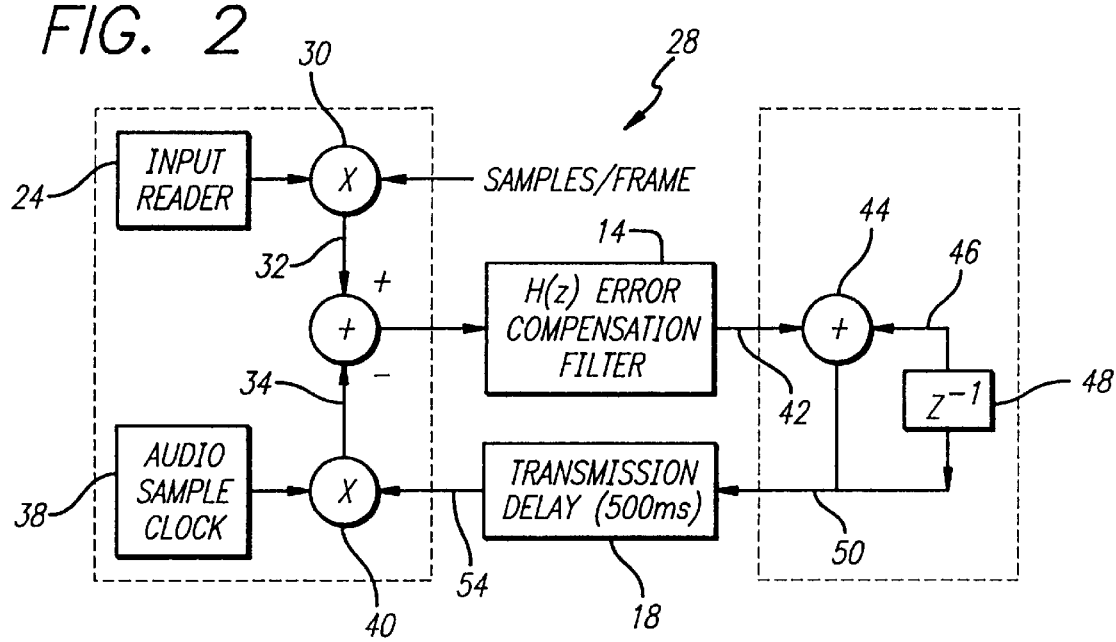
FIG. 2 illustrates the high level structure of a processor in an audio sample processing system, in accordance with the present invention.
Figure 3:
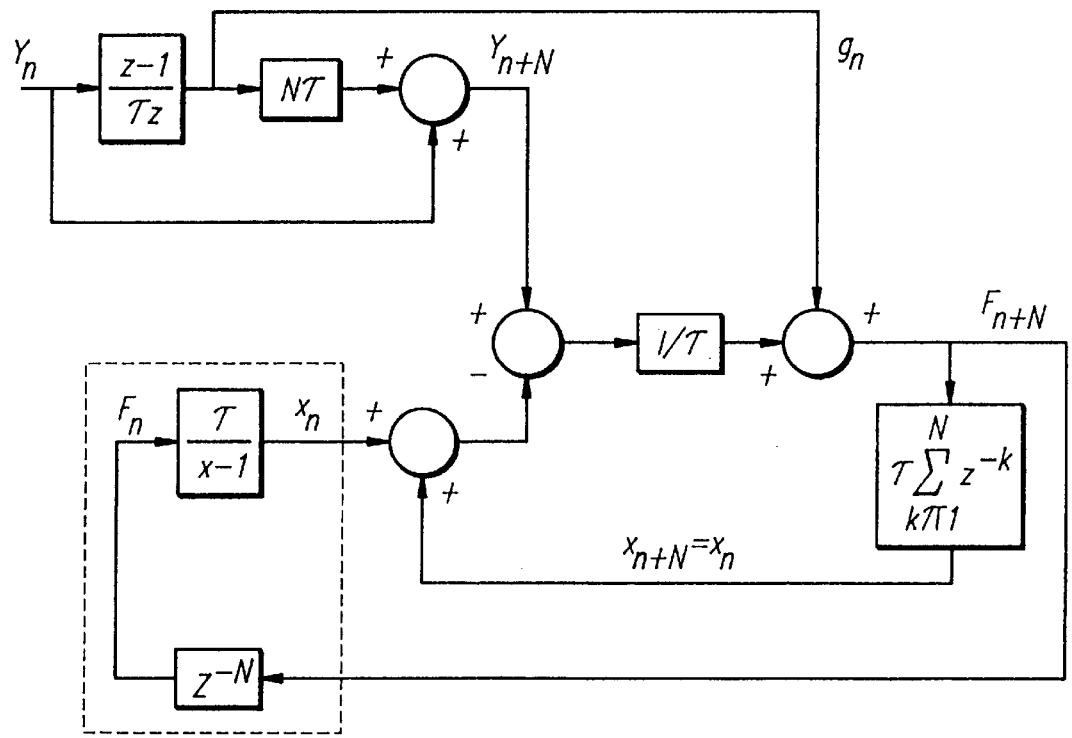
FIG. 3 illustrates the high level structure of a processor in an audio sample processing system, in accordance with the present invention.
Figure 4:
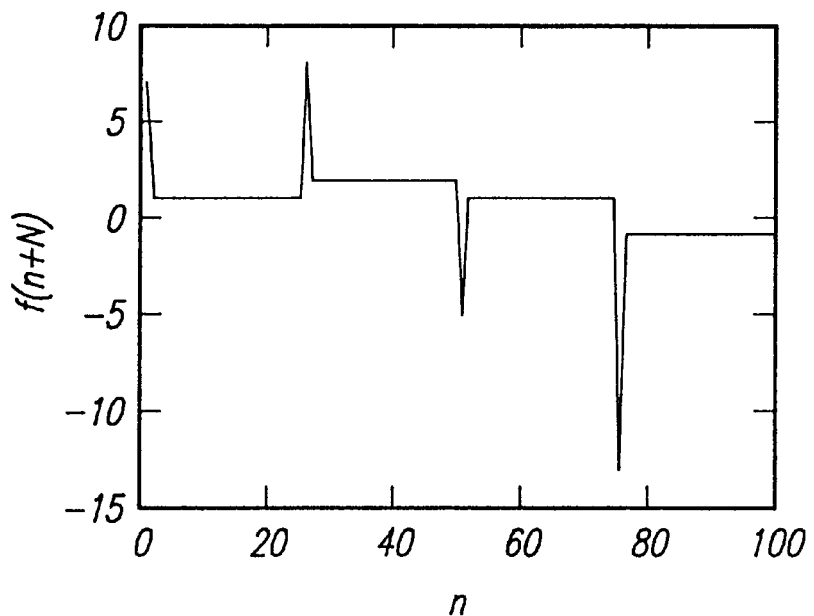
FIG. 4 is a chart illustrating the sample rate in an audio sample processing system in accordance with the present invention.
Figure 5:
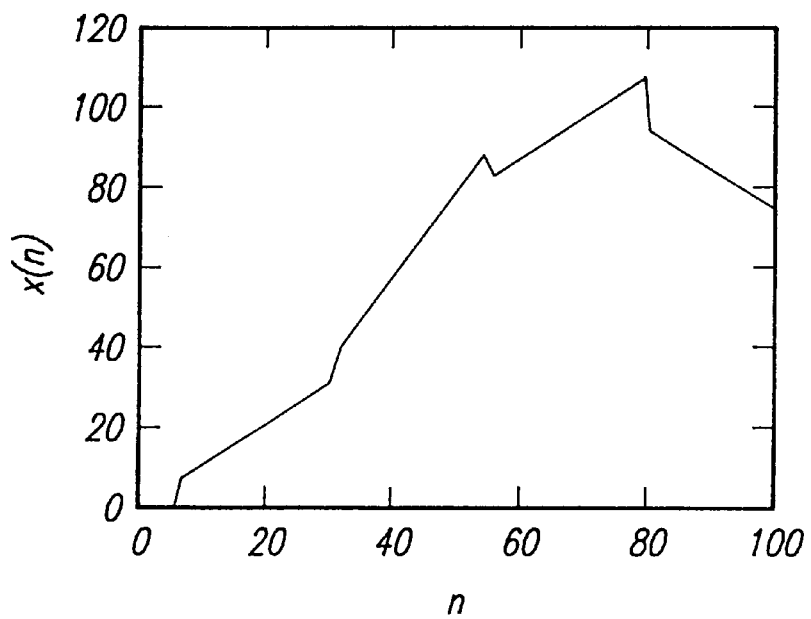
FIG. 5 is a chart illustrating the actual sample number in an audio sample processing system in accordance with the present invention.
Figure 6:
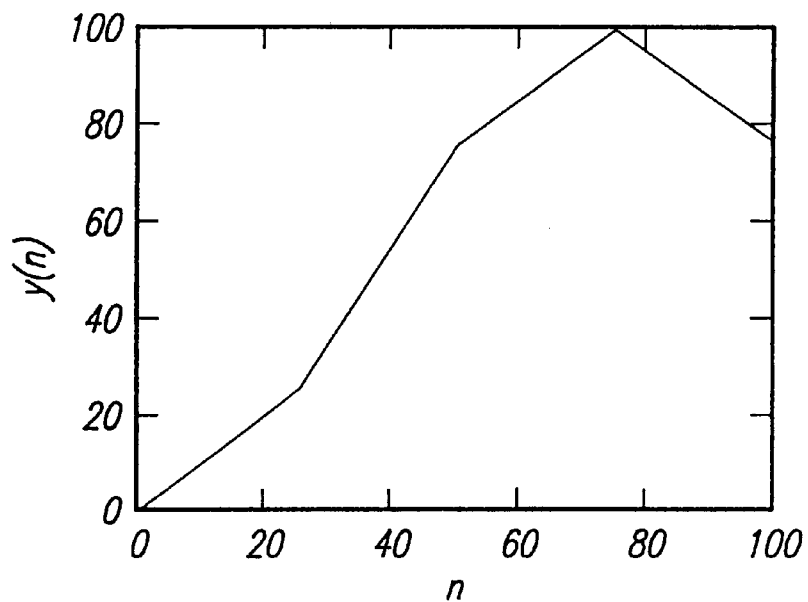
FIG. 6 is a chart illustrating the desired sample number in an audio sample processing system in accordance with the present invention.
Figure 7:
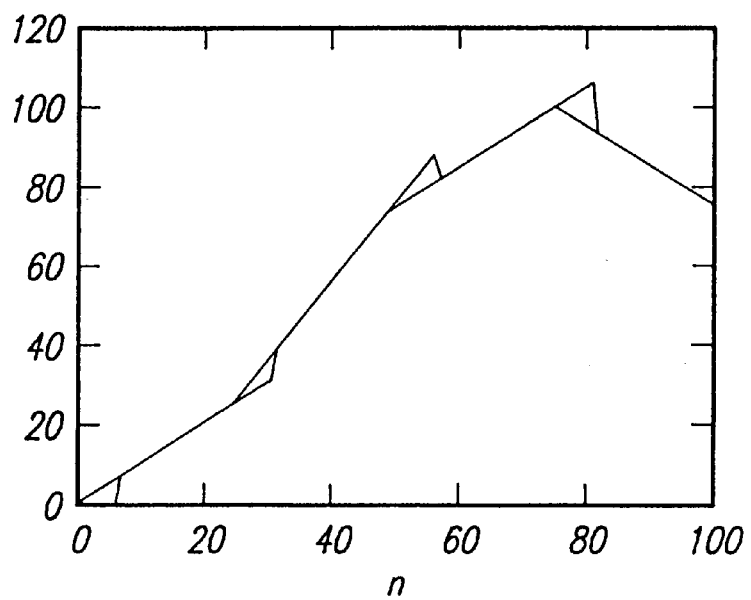
FIG. 7 is a chart illustrating an example of the performance of an audio sample processing system in accordance with the present invention.

Referring now to the drawings, and in particular to FIG. 1, and as also shown in FIGS. 2 and 3, there is shown a high-level representation of the structure employed in an audio sample processing system 10 which includes a rate controller 12 including an audio sample tracker 14 which compensates for a delay 54 in a network 18 and synchronizes an audio output 20 to an audio input 22 delayed by network 18.

System 10 reads an input such as external time code from an input source 22 into an input reader 24. The input is sent by a serial link 26 to a processor 28, and to a multiplier 30 (which multiplies frames by samples per frame for example) to generate a desired audio sample number 32. Desired audio sample 32 is added in adder 34 to an actual sample number 36 generated in a clock 38, such as an AES audio clock, through a multiplier 40 which multiplies clock 38 by samples per frame to generate actual sample number 36. The difference between the desired and actual audio sample numbers constitutes delay error 16. Error 16 is input to audio sample tracker 14 which generates a changed audio sample rate 42, which is added in adder 44 to the last rate 46 generated in block 50 to generate a new rate 50. New rate 48 is sent through network 18 to a plurality of player/recorders 52, and through block 54 to generate rate 56 fed back to multiplier 40. Clock 38 is also fed into player/recorder 52.

System 10 is adapted to be synchronized with an input 22 such as an external time code source, a manual scrub wheel, or a computer mouse, in real time. Input 22 may comprise a frame based source for synchronization, such as SMPTE time code. In order to synchronize system 10 with rate controller 12, input source 22 is read at the system audio input. Input 22 may have substantial variations in it, depending on the motion imparted by the user of the audio source. Input 22 may be moving at a steady rate for a long period of time, and may suddenly stop or change rate. If the audio source is moved at fast forward, the time code could start moving at a fast rate. System 10 takes a snap shot, every 30th of a second for example, of where it should be, and then sends commands over network 18 to get the audio output to where it should be.

System 10 controls a plurality of player/recorders 52 connected over network 18, through controlling processor 28 that can control any number of player/recorders 52, but isn't a player/recorder itself. Processor 28 sends to the player/recorders 52 a rate at which to play. Processor 28 also monitors what the current input 22 is through serial link 26 from the input reader 24.

Input 22 is read by reader 24 and sent through serial link 26 to multiplier 30 in processor 28 which multiplies the input 22 by samples per frame, to tell the system where it should be on the audio track. Processor 28 has software that is being told where it should be on the audio track, and then sends that information over the network 18 to the player/recorders 52 so that they can be at the right place on the audio track. The requirement is that the player/recorders 52 be in sync with the input 22, regardless of whether the input is stopped or moving at play speed or moving in reverse or fast forwarding. Because there is a delay in system 10 through network 18, it can't always be in sync, because when the external input 22 starts changing in an unexpected way, it takes time for the player/recorders 52 to catch up, and in the interim there will be some error 16. Sample tracker 14 is adapted to minimize that error 16, to address the motion control problem. Network 18 may have a delay for example of about ½ second between sending a new rate command to the player/recorders 52, and the time that command would actually take effect and get across network 18 to all the player/recorders 52. If only one new rate command is sent every ½ second then, it will take a very long time to correct for even small variations in the rate that the external input 22 is moving at. Therefore, network 18 is adapted to send the rate commands faster than the network delay. Effectively there could be several rate commands that are cued up over network 18 but have not taken effect yet. These rates are not going to take effect until the future, but the current time code position needs to be measured and rates sent so as to minimize the error between the position of player/recorders 52 and the external input 22.

The input/output audio clock 38 derived for example from an AES reference provides a time stamp to enable the delay to be determined between when a new rate command is sent and when it will take effect. Sample tracker 14 for example looks at the current AES reference time, adds a ½ second to it which may be the worst case time for a network command to get across and take effect, time stamps the rate command with the current time plus a half second, and then sends it to get to the player/recorders 52 on time but not to take effect until that ½ second delay is over.

The parameters for system 10 may be calculated in the following equations, for example, as illustrated in FIG. 3, wherein $y_n$ is the desired sample number at time $n\tau$ $g_n$ is the estimated desired sample rate at time $n\tau$ $y_{n+N}$ is the predicted value of y at time $n\tau+N\tau$, $x_n$ is the actual sample value at time $n\tau$, $x_{n+N}$ is the predicted value of x at time $n\tau+N\tau$, and $f_n$ is the actual sample rate at time $n\tau$.

The desired sample value is sampled at time interval $\tau$ (typically, $\tau$=0.1 sec.) The sample rate is updated at time interval $\tau$. The execution of sample rate change is delayed by $N\tau$. Typically, N=5.)

The sample error feedback that is used to update the sample rate is based on predicted values of y and x at $N\tau$ seconds in the future. The predicted value of y is based on the estimated desired sample rate given by $$g_n = \frac{y_n - y_{n-1}}{\tau}$$

Thus, $$y_{n+N} = y_n + N\tau g_n$$

The predicted value of x is computed from the known value at time $n\tau$, and the known values of sample rate during the previous N intervals. Thus, $$x_{n+N} = x_n + \tau \sum_{k=n}^{n+N-1} f_k.$$

The next value of sample rate is computed from the predicted sample error, as follows:

$$f_{n+N} = \frac{y_{n+N} - x_{n+N} + g_n \tau}{\tau}$$

In the model shown in the block diagram, the actual sample value is computed from the past history of sample rates, as follows:

$$x_{n+1} = x_n + \tau f_n$$

The transfer function from $y_n$ to $x_n$, denoted by H(z), simplifies to $$H(z) = (N+2)z^{-(N+1)} - (N+1)z^{-(N+2)},$$

where we have made use of the identity $$(z-1)\sum_{k=o}^{N} z^k = z^{N+1} - 1.$$

The transfer function from $y_n$ to $f_{n+N}$, denoted by G(z), is given by $$G(z) = (1/\tau)[(N+2) - (2N+3)z^{-1} + (N+1)z^{-2}].$$
$$= (1 - z^{-1})[(N+2) - (N+1)z^{-1}].$$

The transfer function from $f_{n+N}$ to $x_n$ denoted by F(z), is given by $$F(z) = \frac{\tau z^{-n}}{Z-1}$$

System 10 is adapted to program in an essentially fixed compensating system delay time, as also illustrated in the charts in FIGS. 4–7. For example, at $z^{-N}$, where a new rate is being sent at 10 times per second, but would take ½ second to get across the network, N would be 5. Inside the processor that's running the rate controller, there would be a 5 rate sample delay. In the delay problem, the system is looking at the current time from an external source, and comparing a rate that gets back to the actual sample number location 36 in FIGS. 1 and 2. The system is comparing a delayed version of where the player/recorders should be to the current position of the time code. The system calculates a predicted sample number, for example as shown in FIG. 3. The input at 1 over tao is the predicted error, based on the assumption that the incoming time code will continue changing at the rate that it has been changing at. This provides the plus term for the error, which is the predicted value for the incoming time code. The minus term for the error is the calculated position that the player/recorders will be after the delay. The error is the delayed error expected to be seen 5 samples from the current time. That part of the sample tracker is modeling the network and the player/recorder system, with a delay inside of the sample tracker.

The system accounts for a network delay that is longer than the processing period for each sample within the control, by predicting the incoming time code source, and by modeling the delay within the sample tracker. One element puts a delay in the incoming time code source to match the delay in the network, to generate a predicted sample number in the future. The other element models the network delay inside the filter itself, by accumulating all of the previous rates. The block has a summation of k over z to the minus k, which is adding up all the changes that are sent to the system that are still pending on the network but haven't taken effect yet, to figure out where the box is going to be in the future. The predictor and the delayed pipeline modeler for where it will be enable the system to function by comparing delayed positions to delayed positions, not current positions to delayed positions.

For example, the multiplier on the bottom left of FIG. 2 represents the audio transport head, which models the head of a tape recorder. The nominal rate (normal play speed) for the system is typically 48000 samples/second, but the transport rate may be set anywhere from zero to ±2 times the nominal rate (ideally, the system would be able to handle nonzero rates from about 0.01 to 100 times the nominal rate, positive or negative).

The time code reader reads frame numbers from an external device that may be stopped or moving forward or backward at any of the above rates. The rate of the external device may change drastically at any time, or may remain constant for long periods of time. The special case of unity (nominal) rate may be provided as a separate input to the error compensation filter. The part of the system in the dashed box on the left in FIG. 2 is updated at a rate that allows it to sample frame numbers as fast as they are available from the external device. Typical frame rates are between 24 and 30 frames/second. If the external device is moving slowly, it may see the same frame number repeated many times, then increment by one, repeat many times, etc. If it is moving fast, it will see large jumps in the frame number between each update.

The part of the system in the dashed box on the right in FIG. 2 is updated at a slower rate due to the overhead of broadcasting the new rates to other parts of the system. The time between initiating such a broadcast and the new rate actually taking effect is currently about half a second, for example.

To minimize the sample offset error, the error is to be kept near zero when the input time code frame rate is constant, and to be driven to zero as quickly as possible (while keeping the system stable) when there is a step-function change in the input time code frame rate.

A functional description of the audio sample tracker of the present invention is included in the attached Appendix A.

While this invention has been particularly described with reference to a preferred embodiment thereof, it will be understood by one skilled in the art that the present system may be practiced without many of the specific details disclosed above, and that changes in the above description or illustrations may be made with respect to form or detail without departing from the spirit and scope of the invention.

What is claimed is:

1. A system for processing audio samples, comprising:
   means for generating an audio sample rate input from the motion of an audio source which generates the audio samples;
   means for generating an audio sample rate output from the audio sample rate input, to control the motion of an audio transport, including:
   a network for processing the audio sample rate input to generate the audio sample rate output, which network introduces a delay in the audio sample rate input, generating a delayed audio sample rate input; and
   means for tracking the audio sample rate and compensating for the delay in the audio sample rate input to synchronize the audio sample rate output with the audio sample rate input, comprising:
   means for generating a predicted audio sample rate as of the time of the delayed input;
   means for generating a calculated audio sample rate as of the time of the delayed input; and
   means for comparing the predicted audio sample rate and the calculated audio sample rate to generate an error which is substantially equivalent to the delay and applying the error to the audio sample rate input to generate the audio sample rate output.

2. The system of claim 1, wherein the predicted audio sample rate generating means comprise means for generating a delay in delaying the audio sample rate substantially equivalent to the network delay.

3. The system of claim 1, wherein the calculated audio sample rate generating means comprise means for modeling the network delay.

4. The system of claim 1, wherein the system further comprises means for controlling the motion of the audio transport responsive to an audio input from the audio source and an audio output to the audio transport derived from the audio input, wherein the motion of the audio source generates the audio samples and the audio sample rate input.

5. The system of claim 3, wherein the modeling means comprise means for accumulating the rates prior to the new input rate pending in the system.

6. A method of processing audio samples in a system which comprises means for generating an audio sample rate input from the motion of an audio source which generates the audio samples, means for generating an audio sample rate output from the audio sample rate input, to control the motion for an audio transport, including a network for processing the audio sample rate input and the audio sample rate output, which network introduces a delay in the audio sample rate input, generating a delayed audio sample rate input and means for tracking the audio sample rate and compensating for the delay in the audio sample rate input so as to synchronize the audio sample rate output with the audio sample rate input, comprising means for generating a predicted audio sample rate as of the time of the delayed input means, for generating a calculated audio sample rate as of the time of the delayed input and means for comparing the predicted audio sample rate and the calculated audio sample rate to generate an error which is substantially equivalent to the delay and applying the error to the audio sample rate input to generate the audio sample rate output, the method comprising:

activating the audio input to generate the audio sample rate;

activating the predicted rate generating means to generate a predicated audio sample rate as of the time of the delayed input;

activating the calculated rate generating means to generate a calculated audio sample rate as of the time of the delayed input; and activating the comparing means to generate the error and to apply the error to the audio sample rate input to generate the audio sample rate output.

7. The method of claim 6, wherein the predicted audio sample rate generating means comprise means for generating a delay in delaying the audio sample rate substantially equivalent to the network delay, and the step of activating the predicted audio rate generating means comprises activating the delay generating means to generate the delay in the audio sample rate substantially equivalent to the network delay.

8. The method of claim 6, wherein the calculated audio sample rate generating means comprise means for modeling the network delay, and activating the calculated audio sample rate generating means comprises activating the network delay modeling means.

9. The method of claim 6, wherein the system further comprises means for controlling the motion of the audio transport responsive to an audio input from the audio source and an audio output to the audio transport derived from the audio input, wherein the motion of the audio source generates the audio samples and the audio sample rate input, further comprising controlling the motion of the audio transport responsive to the audio input and the audio output.

10. The method of claim 8, wherein the modeling means comprise means for accumulating the rates prior to the new input rate which are pending in the system, and activating the modeling means comprises activating the accumulating means to accumulate the rates prior to the new input rate which are pending in the system.

* * * * *

UNITED STATES PATENT AND TRADEMARK OFFICE
CERTIFICATE OF CORRECTION

PATENT NO. : 6,086,620
DATED : Jul. 11, 2000
INVENTOR(S) : Richard J. Oliver, Casper William Barnes It is certified that error appears in the above-identified patent and that said Letters Patent is hereby corrected as shown below:

Column 3, line 9, change "50" first occurrence, to read --48-- and, after "New rate", change 48",to read --50--.

Column 4, line 11, after "n ", add a comma and space --, --.

Column 4, line 12, after "n ", add a comma and space --, --.

Column 5, line 45, after "summation of", delete "k over".

Column 5, line 50, after "modeler", delete "for where it", and after "will" delete "be".

Signed and Sealed this

Fifteenth Day of May, 2001

Attest:

NICHOLAS P. GODICI

Attesting Officer     Acting Director of the United States Patent and Trademark Office